March 5, 1968  H. S. BACON  3,371,718
ROTARY JET REACTION MOTORS
Filed Sept. 7, 1966  2 Sheets-Sheet 2
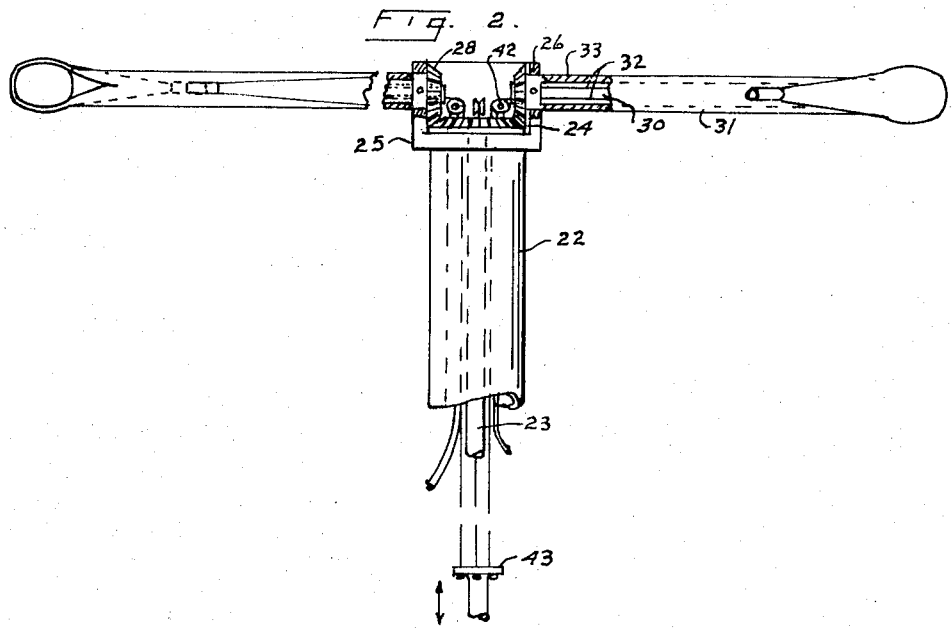
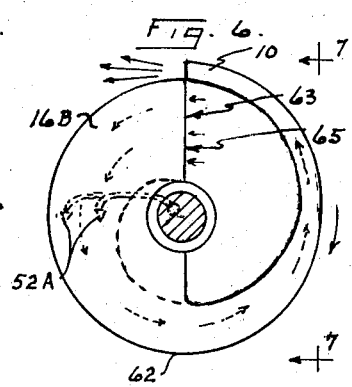
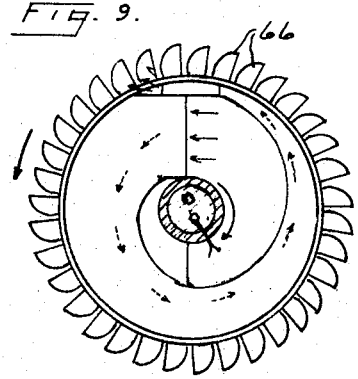
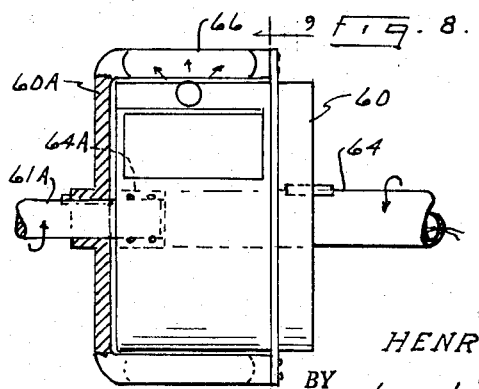
INVENTOR.
HENRY S. BACON
BY
AGENT

United States Patent Office 3,371,718
Patented Mar. 5, 1968

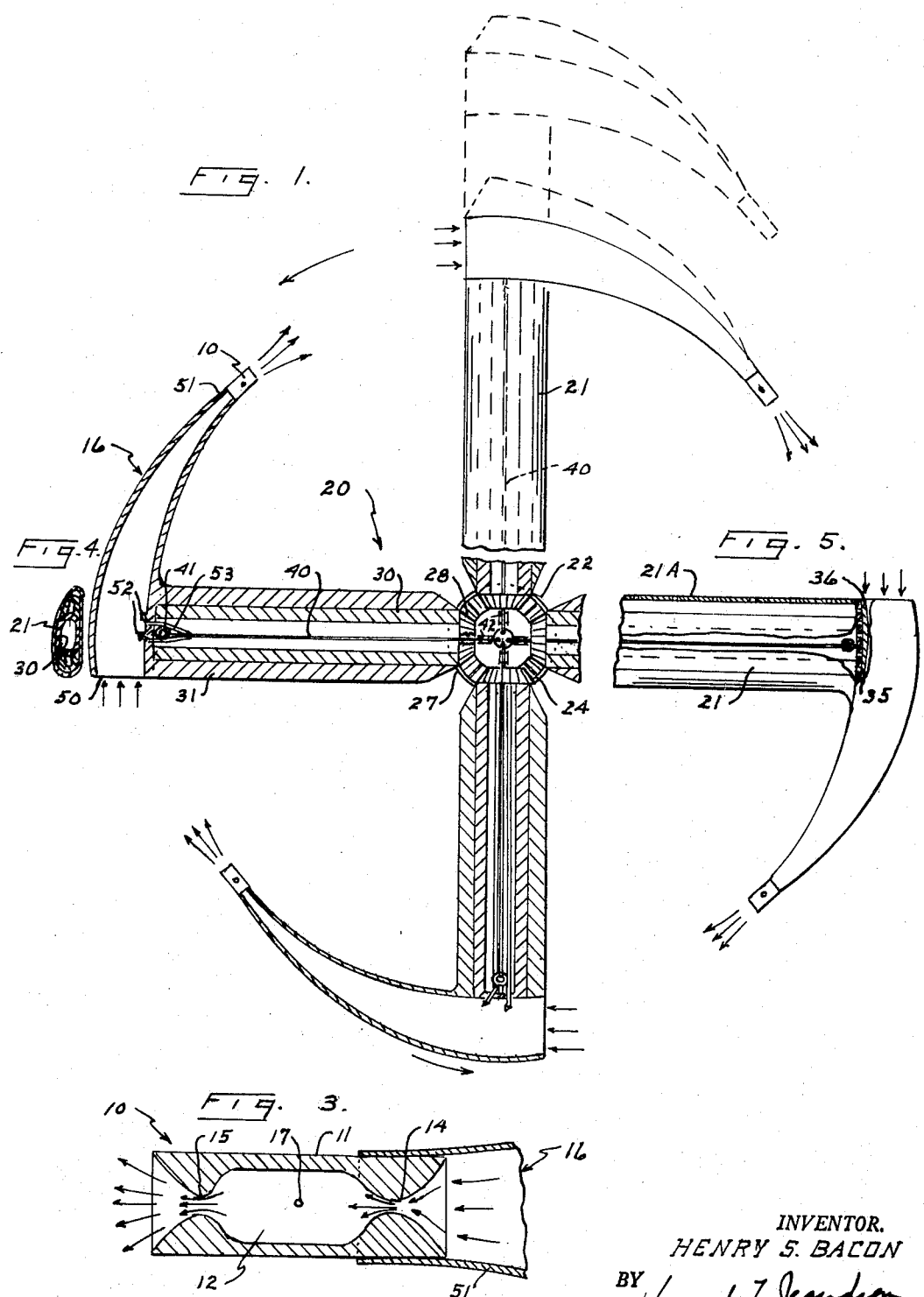

3,371,718
ROTARY JET REACTION MOTORS
Henry S. Bacon, Box 196, Shrewsburg, N.J. 07701
Filed Sept. 7, 1966, Ser. No. 577,631
2 Claims. (Cl. 170—135.4)

ABSTRACT OF THE DISCLOSURE

A thrust producing rotary propeller having a plurality of concentrically mounted rotor blades mounted on a central shaft and a jet reaction engine mounted on the tip of each blade. Each of said jet reaction engines shaped in an arc and positioned within a circular pattern for rotation. Each jet reaction engine formed with a cornucopia shaped air scoop having an enlarged open mouth to scoop air during rotation and a progressively tapered integral area throughout its length to compress the air passing therethrough and the reduced end of the air scoop connected to said jet reaction engine. Said central shaft and blades being hollow and a fuel line and ignition cables strung therethrough to carry fuel to said jet reaction engine and the means of igniting the fuel for operation.

This invention relates to rotary jet reaction engines and more particularly to the provision of means to collect, conduct, mix and automatically compress the air with fuel vapor to burn the compressed mixture within a single rotary mounted jet reaction engine at the end of the air scoop compressor and provide for the expansion and expulsion of the burning gases to produce thrust energy.

Most jet engines consist of separated compressors, burning chambers, turbines, etc. and therefore are large in overall dimensions, complicated in buildup and are subject to high losses along the gas channels.

It is an object of this invention to provide a jet propulsion engine upon a rotary element that due to its taper, compresses the air prior to combustion, to burn the air fuel mixture and driving the rotary mounted jet by emitting the gases that due to their reaction, produce high thrust energy.

A further object of this invention is to combine a plurality of rotary mounted jet engines at tips of an air rotor propeller in which the jet engines are mounted at the tips of the rotor prop blades and in which the air is collected and conducted to mix and compress the air with fuel vapor to burn the compressed mixture within each rotary mounted jet and provide the expansion and expulsion of the burning gases to produce a thrust energy.

A further object of this invention is to provide a rotary mounted jet engine in which the air intake, fuel vapor and compression, burning and expulsion of gases are combined within said single jet engine to produce continuous thrust energy.

A still further object of this invention is to provide a plurality of rotary mounted jet engines in which the air and fuel vapor intake, compression, burning and expulsion of burned gases are combined within each jet and in which all jet engines are equally, radially positioned and combined in balanced thrust relationship.

Other objects of this invention shall be apparent by reference to the accompanying detailed description and the drawings in which:

FIG. 1 is a plan view partially in cross section of a rotor with jet engines mounted on each tip of the rotor propeller blades, FIG. 2 is an elevational view partially in cross section of the rotor and jets, FIG. 3 is a cross sectional view of one of the jet engines, FIG. 4 is a cross sectional view of a rotor blade, FIG. 5 is a plan view of a further embodiment of the jet engine, FIG. 6 is a plan view of a further embodiment of the jet engine, FIG. 7 is a view taken on line 7—7 of FIG. 6, FIG. 8 is a further embodiment of the jet engine shown in FIGS. 6 and 7, and FIG. 9 is a view taken on line 9—9 of FIG. 8.

Referring to the drawings and particularly FIG. 3, there is illustrated a typical jet reaction engine 10 composed of an engine block 11 in which there is a combustion chamber 12. The combustion chamber is provided with an inlet port 14 and an outlet port 15. The end of block 11 in which the inlet port 14 is provided is mounted within a tapering air scoop compressor 16 so that the air and fuel are thoroughly mixed, compressed and delivered through scoop 16, enters port 14 thoroughly compressed. The compressed mixture entering chamber 12 is ignited by an ignition point 17 thus producing a burning of the compressed air and fuel mixture to provide expanding gases of continuous combustion that are expelled through the outlet port 15 to provide continuous thrust energy.

Referring to FIG. 1 there is illustrated an expansile rotor propeller 20 comprised in this instance of four blades 21 that are positioned 90° apart in balanced relationship. Blades 21 are designed as an air-foil as illustrated in FIG. 4 and therefore blades 21 utilized as a rotor-propeller must be axially rotatable to increase or decrease their angle of attack during rotation to provide adequate lifting power for controlled vertical ascent, descent or hovering and provide variable thrust for horizontal flight. With a rotor propeller that is movable from vertical flight to horizontal flight and vice versa, with a controlled universal joint that provides steering of the vehicle on which the propeller is mounted. To provide the means of varying the angle of attack of blades 21, the rotor propeller 20 is mounted on a central shaft 22, FIGS. 1 and 2. Shaft 22 is a hollow stationary shaft providing the necessary support for a rotor propeller. Each blade 21 is provided with a bearing 26 at its mounting end 27 to be supported in cage 25. Propeller 21 is provided with a central hollow tube 30. One end of tube 30 is formed circular to ride in bearing 26 and have a gear 28 affixed to the end thereof. Each blade 21 is comprised of a pair or more of telescoping air-foil shaped tubes, tube 30 being the central tube and tube 31 being the exterior tube. Tubes 30 and 31 are keyed together, that is, a pair of keyways 32 may be provided on the exterior surface for the length of tube 30 while a pair of keys 33 are provided on the interior surface of tube 31 to mate with the keyways 32, keys 33 matching and fitting slideably within the keyways 32. Thus tube 31 in its retracted position will telescope over the tube 30 as illustrated in full lines in FIG. 1. However with centrifugal force during rotation, tube 31 can move outward due to its telescoping mounting to the dotted position or past as illustrated in FIG. 1. Thus all blades 21 will extend in the same manner under centrifugal force. To control the movement of blades 21, each blade is provided within tube 30 with a cable 40 that is affixed to eye 41 at the exterior end of the hollow tube 31. Cable 40 extends through tube 30, through gear 28, over a pulley 42 and downward through the hollow shaft 22 to a single plate 43 where the cables 40 are attached. Plate 43 is movable up or down by a winch (not shown). Thus with all cables 40 retained in tht position as illustrated in FIG. 2, the blades 21 will be held in their normal retracted position as illustrated in FIGS. 1 and 2. However with the movement of plate 43 upward, FIG. 2, blades 21 will move outward under control during rotation due to centrifugal force and with sufficient release upward of plate 43, blades 21 may move outward to any maximum extension required. It is to be understood that with the equal extension of blades 21 as the blades extend, the lift surface or propelling surface of the blade increases to provide greater lift or greater propulsive power as the case may be. It is to be further noted that blades 21 due to their mounting, each blade may be equally rotated a desired degree to increase or decrease the angle of attack, that is, by rotating shaft 23, gear 24 will be rotated and each of the gears 28 will be similarly rotated and since gears 28 are affixed to the hollow shafts 30, each blade 21 will be rotated the same number of degrees to increase or decrease the angle of attack. Thus the rotor propeller 20 to be utilized in this invention is clearly operative as an air lift with blades 21 extended for vertical flight or as a propulsive air thrust unit with blades 21 contracted for horizontal flight. Each engine may or may not be aligned with the blade angle of attack. Thus the transition from vertical flight to horizontal flight is made by moving plate 43 downward. To provide the rotary power for propeller 20, there are a plurality of engines 10. Each engine 10 is mounted on an air compressing scoop 16, said air compressing scoop may be variable, each air compressing scoop 16 is mounted at the exterior end of a blade 21. Air scoop 16 is either integrally formed with the hollow tube 31 or may be affixed to the end of hollow tube 31 to form an integral relationship, air scoop 16 may be extended to increase the air intake. Air scoop 16 is generally formed as a cornucopia, that is, it is provided with an enlarged open air scoop inlet end 50 and a constricted outlet end 51 in which the jet engine 10 is mounted. Thus it is apparent that with the air scoop compressor 16 mounted at the end of each blade 21, during counterclockwise rotation of blade 21, air will enter inlet 50 and will be compressed as it passes through the tapering air scoop compressor 16 to be forced into and burned as it passes through the jet engine 10 and is ejected therefrom. In addition there are provided fuel jets 52 mounted within the tapering air scoop 16 to spray fuel vapor within the air being scooped as it is compressed to provide a highly combustive mixture entering the jet engine 10. The fuel jets 52 are connected by tubes 53 through the hollow shaft 30 and through hollow shaft 22 to a fuel supply and pump (not shown). Of course the fuel supply will be regulated to provide the proper mixture according to the speed and load desired during the operation of the rotary jets. The ignition point 17 is also electrically connected through air scoop 16 through the hollow shaft 30 and down through hollow shaft 22 to an ignition coil and ignition system (not shown). Thus it is apparent that propeller 20 may be powered for rotation in a counter-clockwise direction by the jets 10 mounted on the air scoops 16 and affixed to the end of blades 21. In a further embodiment of this invention illustrated in FIG. 5, the leading edge 21A of the blade 21 may be perforated or provided with a plurality of inlet air ports. Thus in this embodiment tube 31 on its leading edge 21A will be perforated and tube 30 must be similarly perforated to permit the passage of air through the leading edge 21A into the hollow center of tube 30. The exterior end of tube 30 and tube 31 must be perforated or provided with ports 35 so that the air flow will be through tube 30 and due to centrifugal force will pass through ports 35 into the tapering air scoop 16 to thus increase the charge of air through the tapering air scoop 16 to the jet thrust engine 10. This is an advantage to be utilized as the vehicle rises and particularly when the air density decreases. Thus if the device is started with the air scoop through port 50 only, by controlling the air flow through ports 35, that is, by opening or closing a shutter 36, the increase air intake can be provided when desired. To provide a balanced relationship, the jets 10 must be operated in pairs, that is, on two opposed blades. Thus two jets or four jets may be operated in the present embodiment as illustrated. However similarly the propeller 20 may have six, eight, etc. blades to provide this balanced relationship as the case may be.

Referring to FIGS. 6 and 7 there is illustrated a further embodiment of this invention in which the jet engine 10 is mounted on the periphery of a wheel 60, the wheel 60 being mounted on a shaft 61. The wheel 60 is comprised of a circular housing 62. Housing 62 as illustrated in FIG. 6 is comprised of an air scoop 63 mounted on a hollow central shaft 64. The air scoop 63 is provided with an inlet port 65. The flow of air will be fed into the air scoop 63 indicated by the arrows passing through an open port 65 and due to the clockwise rotation of the wheel 60, the air flow will be fed into the open end of air scoop 63 as illustrated in FIG. 6. The air engulfed by the air scoop 63 will, due to its cornucopia shape of the air scoop, be compressed as it passes through to the jet engine 10 as in the previous embodiment. The fuel mixture passes through the hollow shaft 64 and is fed to a pair of jets 52A which feed into the cornucopia scoop 16B. Thus the fuel is mixed with the air that is fed to the jet engine 10 and the exhaust thrust from jet engine 10 drives wheel 60 in a clockwise direction as illustrated. Although a single wheel 60 and single motor 10 are shown, a plurality of wheels 60 and jets 10 may be utilized on a single shaft 61

Referring to FIGS. 8 and 9 there is illustrated a further embodiment in which the wheel 60 may be similar to the previous embodiment mounted on a hollow shaft 64. However in this embodiment shaft 64 is provided with a bearing 64A and shaft 61A is mounted in bearing 64A. Thus shaft 61A and 64 are freely rotatable independently of each other. This is necessary in this embodiment as shaft 64 will turn clockwise with the thrust reaction of engine 10, but a freely rotatable wheel 60A is mounted or affixed to shaft 61A and will be driven counter-clockwise due to the periphery of wheel 60A being provided with cup shaped blades 66 that are extended at 90° to wheel 60A and are positioned directly in the exhaust of thrust engine 10 as it moves in a clockwise rotation on shaft 64. The blast of exhaust gases from engine 10 will impinge on blades 66 forcing wheel 60A to rotate counter-clockwise. With shafts 61A and 64 rotating in opposite directions, the drive may be utilized from each shaft separately or by gearing (not shown) the drive of both shafts may be translated to a single shaft to provide the maximum drive from engine 10.

Although we have illustrated a jet engine for the combustion of air fuel mixture to produce a jet thrust, the jet engine may be varied in size or shape as long as the principle of propulsion remains the same and although the jet engines have been applied to a single shaft to produce rotation and thus eliminate torque, the jet engines may be mounted in any similar arrangement about the periphery of a wheel or rotor prop with respect to a central shaft as long as the thrust engine is providing its own force for scooping and compressing air to be mixed with fuel to continue the operation of the jet engine without departing from the spirit of this invention and although the air scoop has been designed to conform with a radial drive, that is, generally circular in formation, the air scoop may take any form, it may be a plurality of straight scoops mounted concentrically about a shaft or wheel or prop and it may be enlarged or wider at the air scooping end without departing from the spirit of this invention and this invention shall be limited only by the appended claims.

I claim:

1. In a rotary mounted jet reaction engine, in combination, a rotor comprising a plurality of rotor blades, each one formed as an air foil and being a telescoping tube, each rotor blade supporting a single jet reaction engine shaped in an arc and positioned at the outer tip thereof, a central shaft to support said rotor blades in a freely rotatable relationship in a single plane, each of said jet reaction engines having a cornucopia shaped air scoop and being provided with a fuel supply and igniting means and positioned within a circular pattern of rotation, means to extend said rotor blades progressively outward under centrifugal force to provide greater vertical air lift and means to progressively contract said rotor blades to provide propulsive air thrust in other than a vertical flight, each of said air scoops having a progressively tapered and arced integral area throughout its length to compress air passing therethrough to said engine.

2. In a rotary mounted jet reaction engine, in combination, a rotor comprising a plurality of rotor blades, each one formed as an air foil and being a telescoping tube, each rotor blade supporting a single jet reaction engine shaped in an arc and positioned at the outer tip thereof, a central shaft to support said rotor blades in a freely rotatable relationship in a single plane, each of said jet reaction engines provided with a fuel supply and igniting means and shaped in an arc and positioned within a circular pattern of rotation, each jet reaction engine containing an air scoop, said air scoop having an enlarged open mouth to scoop air in rotation, said air scoop having a progressively tapered and arced integral area throughout its length to compress air passing therethrough during rotation, said air scoop connected at its smallest end adjacent the periphery of said blades to said jet reaction engine, said air scoops being extendable to increase the volume of air intake, said engines discharging their burned gases at high velocity to provide thrust power to said rotor.

References Cited

UNITED STATES PATENTS

| | | | |
|---|---|---|---|
| 2,220,066 | 11/1940 | Cornell. | |
| 2,407,824 | 9/1946 | Fisher | 60—39.35 |
| 2,499,863 | 3/1950 | Hart | 60—39.35 |
| 2,582,893 | 1/1952 | Teague | 170—135.4 |
| 2,590,063 | 3/1952 | Bailey | 60—39.35 |
| 2,690,809 | 10/1954 | Kerry | 170—135.4 |
| 2,717,043 | 9/1955 | Isacco | 170—135.4 |
| 2,927,426 | 3/1960 | Welsh | 60—39.35 |

FOREIGN PATENTS

| | | |
|---|---|---|
| 1,093,417 | 11/1954 | France. |
| 901,820 | 7/1962 | Great Britain. |
| 307,208 | 4/1933 | Italy. |

EVERETTE A. POWELLE, Jr., *Primary Examiner.*

MARTIN P. SCHWADRON, *Examiner.*